(12) United States Patent
Lo et al.

(10) Patent No.: US 7,493,217 B2
(45) Date of Patent: Feb. 17, 2009

(54) HAZARD WARNING MEANS FOR VEHICLES

(75) Inventors: Kok Keung Lo, Hong Kong (CN); Kum Wheang Richard Yeck, 87 Amoy Street, Singapore 069906 (SG)

(73) Assignees: The Hong Kong Polytechnic University, Hong Kong Sar (CN); Kum Wheang Richard Yeck, Singapore (SG)

( * ) Notice: Subject to any disclaimer, the term of this patent is extended or adjusted under 35 U.S.C. 154(b) by 665 days.

(21) Appl. No.: 10/755,345

(22) Filed: Jan. 13, 2004

(65) Prior Publication Data

US 2005/0154501 A1    Jul. 14, 2005

(51) Int. Cl.
*G06G 7/78* (2006.01)
*G08G 1/16* (2006.01)

(52) U.S. Cl. ................... 701/301; 340/468; 340/471; 340/435; 340/436; 340/701; 340/702; 701/300

(58) Field of Classification Search .......... 701/1, 701/300–301; 340/471, 472, 467, 463, 475, 340/435–436, 701–702, 468; 382/104; 348/149
See application file for complete search history.

(56) References Cited

U.S. PATENT DOCUMENTS

| | | | | |
|---|---|---|---|---|
| 4,107,647 A | * | 8/1978 | Yoshino ................ 340/467 |
| 4,723,078 A | * | 2/1988 | Neuffer et al. .......... 340/436 |
| 4,824,185 A | * | 4/1989 | Leiber et al. .......... 303/113.5 |
| 4,824,186 A | * | 4/1989 | Leiber et al. .......... 303/114.2 |
| 4,843,368 A | * | 6/1989 | Poulos .................. 340/464 |
| 4,895,021 A | * | 1/1990 | Ishizeki ................ 73/114.24 |
| 5,289,182 A | * | 2/1994 | Brillard et al. .......... 340/902 |
| 5,309,141 A | * | 5/1994 | Mason et al. ........... 340/467 |
| 5,533,583 A | * | 7/1996 | Adler et al. ............ 180/65.4 |
| 6,023,221 A | * | 2/2000 | Michelotti ............. 340/471 |
| 6,158,822 A | * | 12/2000 | Shirai et al. ............ 303/3 |
| 6,322,164 B1 | * | 11/2001 | Sakamoto et al. ....... 303/115.4 |
| 6,744,359 B1 | * | 6/2004 | Wasilewski et al. ..... 340/467 |

(Continued)

FOREIGN PATENT DOCUMENTS

DE          3505541 A  *  8/1986

(Continued)

OTHER PUBLICATIONS

77 GHz fully-MMIC automotive forward-looking radar [using pHEMTs], Kondoh, H.; Sekine, K.; Takatani, S.; Takano, K.; Kuroda, H.; Dabkowski, R.; Gallium Arsenide Integrated Circuit (GaAs IC) Symposium, 1999. 21st Annual, Oct. 17-20, 1999 pp. 211-214, Digital Object Identifier 10.1109/GAAS.1999.803760.*

(Continued)

*Primary Examiner*—Cuong H Nguyen
(74) *Attorney, Agent, or Firm*—Buchanan Ingersoll & Rooney PC

(57) ABSTRACT

A hazard warning means for a vehicle, including:
  deceleration triggered actuation means,
  controlling means, and
  visual indicators,
wherein said deceleration triggered actuation means including means for detection of a deceleration of a prescribed threshold and means for generating an actuation signal upon detection of said deceleration, said controlling means includes means for causing said visual indicating means to generate visible signals representing hazard conditions for a predetermined time.

18 Claims, 4 Drawing Sheets

U.S. PATENT DOCUMENTS

| | | | |
|---|---|---|---|
| 6,864,786 B2* | 3/2005 | Speckhart et al. | 340/467 |
| 2002/0105423 A1* | 8/2002 | Rast | 340/479 |
| 2004/0022416 A1* | 2/2004 | Lemelson et al. | 382/104 |
| 2004/0160315 A1* | 8/2004 | Speckhart et al. | 340/467 |
| 2005/0154501 A1* | 7/2005 | Lo et al. | 701/1 |
| 2006/0092043 A1* | 5/2006 | Lagassey | 340/907 |
| 2006/0095199 A1* | 5/2006 | Lagassey | 701/117 |
| 2007/0252686 A1* | 11/2007 | Andrews et al. | 340/479 |

FOREIGN PATENT DOCUMENTS

| | | | |
|---|---|---|---|
| JP | 10119607 A | * | 5/1998 |
| JP | 2002006035 A | * | 1/2002 |
| WO | WO 9954172 A1 | * | 10/1999 |

OTHER PUBLICATIONS

Antenna requirements and architecture tradeoffs for an automotive forward looking radar, Alland, S.W.; Radar Conference, 1998. RADARCON 98. Proceedings of the 1998 IEEE, May 11-14, 1998 pp. 367-372, Digital Object Identifier 10.1109/NRC.1998.678029.*

A compact manufacturable 76-77-GHz radar module for commercial ACC applications, Gresham, I.; Jain, N.; Budka, T.; Alexanian, A.; Kinayman, N.; Ziegner, B.; Brown, S.; Staecker, P. Microwave Theory and Techniques, IEEE Transactions on On pp. 44-58, vol. 49, Issue: 1, Jan. 2001.*

AHS safe control laws for platoon leaders, Li, P.; Alvarez, L.; Horowitz, R.; Control Systems Technology, IEEE Transactions on vol. 5, Issue 6, Nov. 1997 pp. 614-628, Digital Object Identifier 10.1109/87.641405.*

D.Godbole and J.Lygeros, Longitudinal control of the lead car of a platoon Berkeley: Inst. Transportation Studies, Univ. California, Tech. Rep. PATH Memorandum 93-7, 1993.*

A.Hitchcock, An example of quantitative evaluation of AVCS safety, PATH Berkeley: Univ. California, Tech. Rep., Aug. 1993.*

H. Y.Chiu, G. B.Stubb Jr., and S. J.Brown Jr., "Vehicle follower control with varabile-gains for short headway automated guideway transit system," Trans. ASME, Series G, J. Dynamic Syst., Measurement, Contr., vol. 99, No. 3, 1977.*

F.Eskafi, D.Khorramabadi, and P.Varaiya, Smartpath: An automated highway system simualtor Berkeley: Inst. Transportation Studies, Univ. California, Tech. Rep. PATH Memorandum 92-3, 1992.*

P.Varaiya, "Smart cars on smart roads: Problems of control," IEEE Trans. Automat. Contr., vol. 38, pp. 195-207, 1993.*

L.Alvarez, Automated highway systems: Safe platooning and traffic flow control, Ph.D. dissertation Berkeley: Dept. Mech. Eng., Univ. California, 1996.*

P.Li, R.Horowitz, L.Alvarez, J.Frankel, and A.Roberston, An AVHS link layer controller for traffic flow stabilization Berkeley: Inst. Transportation Studies, PATH, Univ. California, Tech. Rep. UCB-PATH 95-7, Nov. 1995.*

S. J.Skalr, J. P.Bevans, and G.Stein, "$\,$'Safe-approach' vehicle follower control," IEEE Trans. Veh. Technol., vol. VT-28, pp. 56-62, 1979.*

Integrated automotive sensors, Russell, M.E.; Drubin, C.A.; Marinilli, A.S.; Woodington, W.G.; Del Checcolo, M.J., Microwave Theory and Techniques, IEEE Transactions on, On pp. 674-677, vol. 50, Issue: 3, Mar. 2002.*

Minimum stopping distance for linear control of an automatic car-following system, Min Young Cho; Lichtenberg, A.J.; Lieberman, M.A.; Vehicular Technology, IEEE Transactions on, vol. 45, Issue 2, May 1996 pp. 383-390 Digital Object Identifier 10.1109/25.492913.*

Smart cars on smart roads: problems of control, Varaiya, P.; Automatic Control, IEEE Transactions on vol. 38, Issue 2, Feb. 1993 pp. 195-207, Digital Object Identifier 10.1109/9.250509.*

Verified hybrid controllers for automated vehicles, Lygeros, J.; Godbole, D.N.;Sastry, S.; Automatic Control, IEEE Transactions on, vol. 43, Issue 4, Apr. 1998 pp. 522-539, Digital Object Identifier 10.1109/9.664155.*

The car-following and lane-changing collision prevention system based on the cascaded fuzzy inference system, Mar, J.; Hung-Ta Lin; Vehicular Technology, IEEE Transactions on, vol. 54, Issue 3, May 2005 pp. 910-924, Digital Object Identifier 10.1109/TVT.2005.844655.*

Sketch of an IVHS systems architecture, Varaiya, P.; Shladover, S.E.; Vehicle Navigation and Information Systems Conference, 1991, vol. 2, Oct. 20-23, 1991 pp. 909-922.*

Minimum realibility requirements on automated vehicles for a safe and reasonably efficient automated highway system, Wei-Bin Zhang; Vehicle Navigation and Information Systems Conference, 1996. VNIS '96, vol. 7, Oct. 14-18, 1996 pp. 103-110.*

A velocity control strategy for vehicular collision avoidance system, Mingyuan Bian; Keqiang Li; Dafeng Jin; Xiaomin Lian; Mechatronics and Automation, 2005 IEEE International Conference, vol. 4, Jul. 29-Aug. 1, 2005 pp. 1827-1830 vol. 4.*

Safe human-robot-coexistence: emergency-stop using a high-speed vision-chip, Ebert, D.; Komuro, T.; Namiki, A.; Ishikawa, M.; Intelligent Robots and Systems, 2005. (IROS 2005). 2005 IEEE/RSJ International Conference on, Aug. 2-6, 2005 pp. 2923-2928, Digital Object Identifier 10.1109/IROS.2005.1545242.*

Low speed car following behaviour from floating vehicle data, Piao, J.; McDonald, M.; Intelligent Vehicles Symposium, 2003. Proceedings. IEEE, Jun. 9-11, 2003 pp. 462-467, Digital Object Identifier 10.1109/IVS.2003.1212955.*

A two-dimensional vehicle control strategy for automated obstacle avoidance, Andrews, S.; Goudy, R.; Intelligent Transportation System, 1997. ITSC 97. IEEE Conference on, Nov. 9-12, 1997 pp. 841-846, Digital Object Identifier 10.1109/ITSC.1997.660583.*

GrooveNet: A Hybrid Simulator for Vehicle-to-Vehicle Networks: Mangharam, Rahul; Weller, Daniel; Rajkumar, Raj; Mudalige, Priyantha; Bai, Fan; Mobile and Ubiquitous Systems—Workshops, 2006. 3rd Annual International Conference on: Jul. 17-21, 2006 pp. 1-8: Digital Object Identifier 10.1109/MOBIQW.2006.361773.*

GrooveNet: A Hybrid Simulator for Vehicle-to-Vehicle Networks; Mangharam, Rahul; Weller, Daniel; Rajkumar, Raj; Mudalige, Priyantha; Bai, Fan; Mobile and Ubiquitous Systems: Networking & Services, 2006 Third Annual International Conference on Jul. 2006 pp. 1-8; Digital Object Identifier 10.1109/MOBIQ.2006.340441.*

Demonstration of a gimbal mounted, high resolution charge coupled device (CCD) television camera in lieu of direct view optics for air to ground targeting; Schreck, P.C.; Aerospace Conference, 1998. Proceedings., IEEE; vol. 3, Mar. 21-28, 1998 pp. 17-27 vol. 3; Digital Object Identifier 10.1109/AERO.1998.685677.*

* cited by examiner

HAZARD WARNING MEANS FOR VEHICLES

FIELD OF THE INVENTION

This invention relates to hazard warning means, devices and apparatus and, more particularly, hazard warning means, devices and apparatus for vehicles and vehicles incorporating same. More specifically, although of course not solely limited thereto, this invention relates to combined indicators and hazard warning devices for vehicles.

BACKGROUND OF THE INVENTION

Almost all road-going vehicles and other vehicles are to be equipped with turn indicators and hazard warning signal means. Turn indicators ("indicators" for brevity) or indicating means are typically distributed on the outside of a vehicle, and more particularly, on its left and right sides as well as at its front and rear ends. Indicators are typically flashing lights provided on the exterior of vehicles to provide indication and advance warning to other road users of the next or eminent direction of turn of the vehicles.

Hazard warning means are typically flashing lights distributed on the outside of a vehicle to alert other road users of imminent danger, risks, hazards or of a sudden stop or declaration. The flashing lights are usually amber but can be of other appropriate colours. Conventional hazard warning means for road-going vehicles are usually manually actuated and are operated by a toggle or a rocker-switch. Upon sensing or detecting of imminent danger, for example, a foreseeable sudden stop or an acute deceleration, a driver will, on his own initiative and volition, actuate the hazard warning means to alert other road users to avoid or alleviate the risk of accidents. Typically, hazard warning means and direction indicators for vehicles share the same set of lights and are usually used in the alternative.

Conventional hazard warning means are inadequate for modern road safety or other modern traffic conditions. This is largely due to the relatively long responsive time for a driver or a commander of a vehicle to react upon sensing or detecting a likelihood of hazard and the subsequent delay in reaction time to actuate the hazard warning means. Also, some drivers have the inconsiderate habit of turning off a road with sudden deceleration before turning and without putting indicators on to show their intention. In many cases, it may be too late for the vehicles following to realize the turn before an accident has occurred.

Hence, it is highly desirable if improved hazard warning means can be provided to alleviate shortcomings of conventional hazard warning means. Furthermore, although of course by no means limiting, it is customary that hazard warning means and indicators share the same hardware, namely, the flashing lights, it will be highly desirable if the improved hazard warning means is adapted for operation under the basis of and compatible with conventional hardware.

OBJECT OF THE INVENTION

Accordingly, it is an object of the present invention to provide improved hazard warning means, devices and apparatus for vehicles and vehicles incorporating same. It is another object of the present invention to provide improved hazard warning means, devices and apparatus for operating with conventional hardware provided for both hazard warning means and turned indicators. Of course, the above objects are to be read disjunctively with the minimum of providing the public with a useful choice.

SUMMARY OF THE INVENTION

According to the present invention, there is provided a hazard warning means for a vehicle, including:
  deceleration triggered actuation means,
  controlling means, and
  visual indicators, wherein said deceleration triggered actuation means including means for detection of a deceleration of a prescribed threshold and means for generating an actuation signal upon detection of said deceleration, said controlling means includes means for causing said visual indicating means to generate visible signals representing hazard conditions for a predetermined time.

For example, the threshold of said deceleration can be set to relate to the response time that adjacent road users will require to take responsive action when the deceleration of said vehicle exceeds said predetermined threshold.

Preferably, the hazard warning means being automatically activated upon braking of said vehicle over a predetermined braking threshold.

Preferably, said hazard warning means being automatically activated upon detection of a deceleration exceeding a predetermined rate.

In a preferred embodiment, said hazard warning means further including visible display means, hazard condition detection means and control means, said control means being adapted to cause operation of said visible display to operate in a hazard warning state upon detection of braking exceeding a predetermined rate by said hazard condition detection means.

According to another aspect of this invention, there is provided a combined indicator and hazard warning means for a vehicle including visible display means, hazard condition detection means and control means, said control means causes said visible display to operate in at least two alternative operating states, wherein, in the first operating state, said visible display means operates as a vehicle indicator and, in the second operating state, said visible display means operates as a hazard warning means for warning other road users, said hazard condition detection means generates an actuation signal upon detection of a rate of deceleration beyond a prescribed rate, said control means causes said visible display means to display hazard warning upon receipt of said actuation signal.

In a preferred embodiment, the hazard condition detection means of the combined indicator and hazard warning means for a vehicle includes an inertia actuator.

Preferably, said inertia actuator includes an actuating lever with a free end and a fixed end, said free end includes a conductive contact for making electrical contact with a contact detector, said free end being resiliently movable with respect to said free end.

Preferably, the output of said contact detector is connected to said control means.

Preferably, said inertia actuator includes a mechanical inertia actuator which is activated when the deceleration exceeds 2 g.

Preferably, said visible display means including at least a pair of light-emitting devices which blink alternatively when operating as an indicator, both said light-emitting devices are turned on intermittently at predetermined intervals when operating as hazard warning means, wherein operating as hazard warning means takes precedent over operating as an indicator.

Preferably, said light-emitting devices include LEDs, lamps and the like or similar devices.

Preferably, said first operating state being user actuatable and said second operating state being both user and automatic actuatable.

Broadly speaking, this invention also describes a vehicle including the combined indicator and hazard warning means above.

In another aspect of this invention, there is also provided control means for vehicle indicating and hazard warning including:
  driving means for driving visible signal display means,
  signaling means for sending signals corresponding to at least first and second alternative operating states of a vehicle to said driving means,
  detection means for detecting a deceleration triggered actuation signal corresponding to the activation of said first operating states,
  decision means to output signals to be generated by said signaling means indicating said first operating state upon detection of said deceleration triggered actuation signal and regardless whether said visible signal display means is operating in second operating state.

BRIEF DESCRIPTION OF THE DRAWINGS

A preferred embodiment of the present invention will be explained in further detail below by way of example and with reference to the accompanying drawings, in which.

DETAILED DESCRIPTION OF THE PREFERRED EMBODIMENTS

Figure 1:
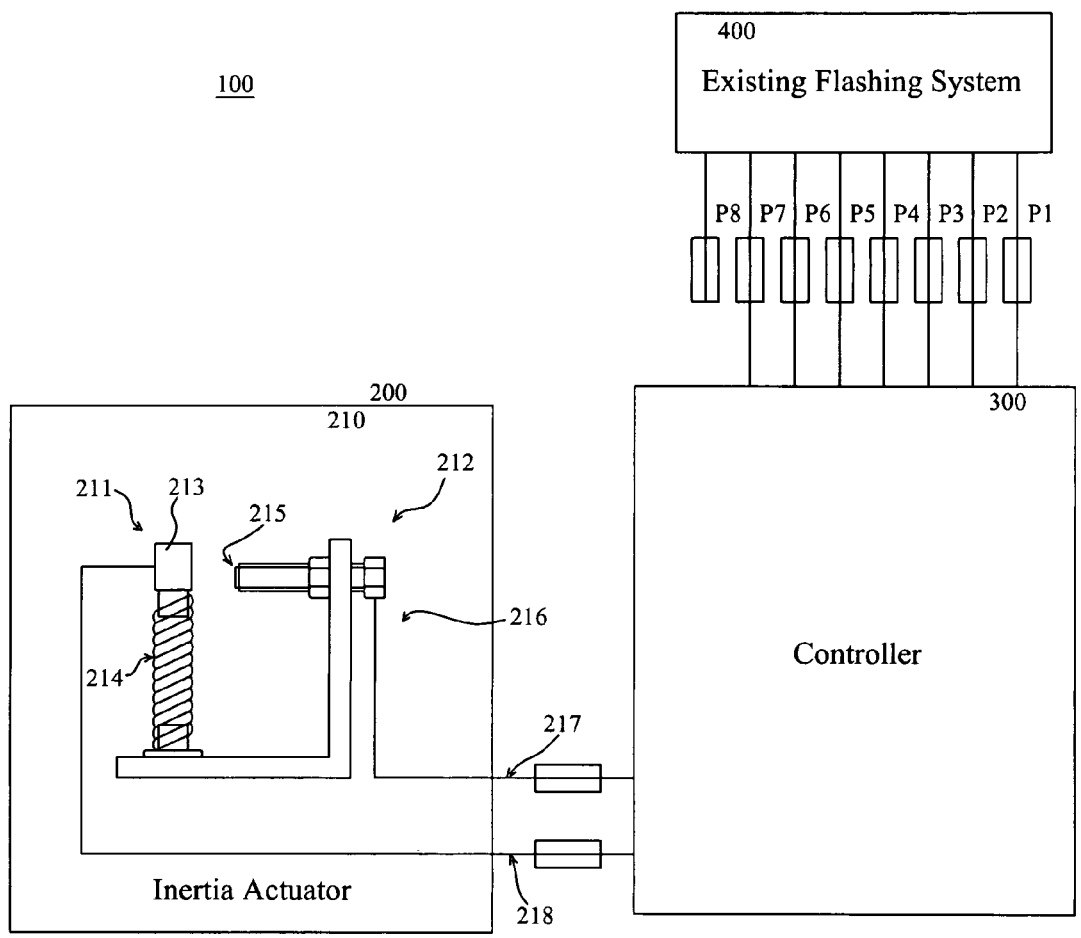
FIG. 1 is a schematic block diagram showing a deceleration actuated hazard warning means.

Referring to FIG. 1, there is shown a hybrid block and circuit diagram showing a hazard warning means 100 of the present invention. The hazard warning means 100 includes an actuation means 200, controlling means 300 and a visual indicating means 400. The actuation means 200 includes a deceleration triggered or activated actuator such as, for example, an inertia actuator 210. The inertia actuator 210 includes a first part 211 and a second part 212 which are adapted to be brought into electrical contact when subject to a deceleration beyond a prescribed threshold. The first part 211 of the inertia actuator includes a contact head 213 which is disposed at a distance from the base of a spring-biased springing bodies. The second part 212 of the inertia actuator 210 includes a protruding contact head 215 which is disposed at a distance from the base of an upstanding body 216. The contact head 213 and the protruding contact head 215 of the first and second parts are respectively disposed and adapted so that, when subject to a deceleration beyond a predetermined threshold, the movable actuation head 233 will move towards the fixed, protruding contact head 215 and make physical contact.

Both the contact head 213 and the protruding contact head 215 include conductive parts which come into contact when the respective heads make physical contact as a result of the deceleration. The contact heads 213 and 215 are connected by conductors to external terminals 217, 218 for interfacing with a controlling means. Thus, a low impedance will appear across the terminals 217 and 218 when the contact heads 213 and 215 are in physical contact, for example, as a result of deceleration which causes the contact head 213 to move towards and contact the fixed protruding head 215 on inertia. On the other hand, a high impedance will appear across the terminals 217 and 218 if there is no such deceleration or the deceleration does not reach the threshold so that the network between the terminals 217, 218 is substantially an open circuit.

When a deceleration activated or triggered actuation means is installed on a vehicle and aligned with the direction of motion of the vehicle, the component of deceleration along the direction of alignment will generate a force component which pushes the contact head 213 towards the fixed protruding head 215 and will make electrical contacts if the deceleration reaches or exceeds a prescribed threshold. Thus, the impedance across the terminals 217 and 218 will provide information to the controller whether the instantaneous deceleration has reached the prescribed threshold. Upon detection of conditions in the actuation means corresponding to such a deceleration, the controlling means 300 will generate the necessary and predetermined hazard indicating signals to drive a visual indicating means for sending out visible warning signals to other road users or other people in the vicinity. For example, the controlling means can cause the lights distributed on the outside of a vehicle to flash at predetermined intervals.

Figure 2:
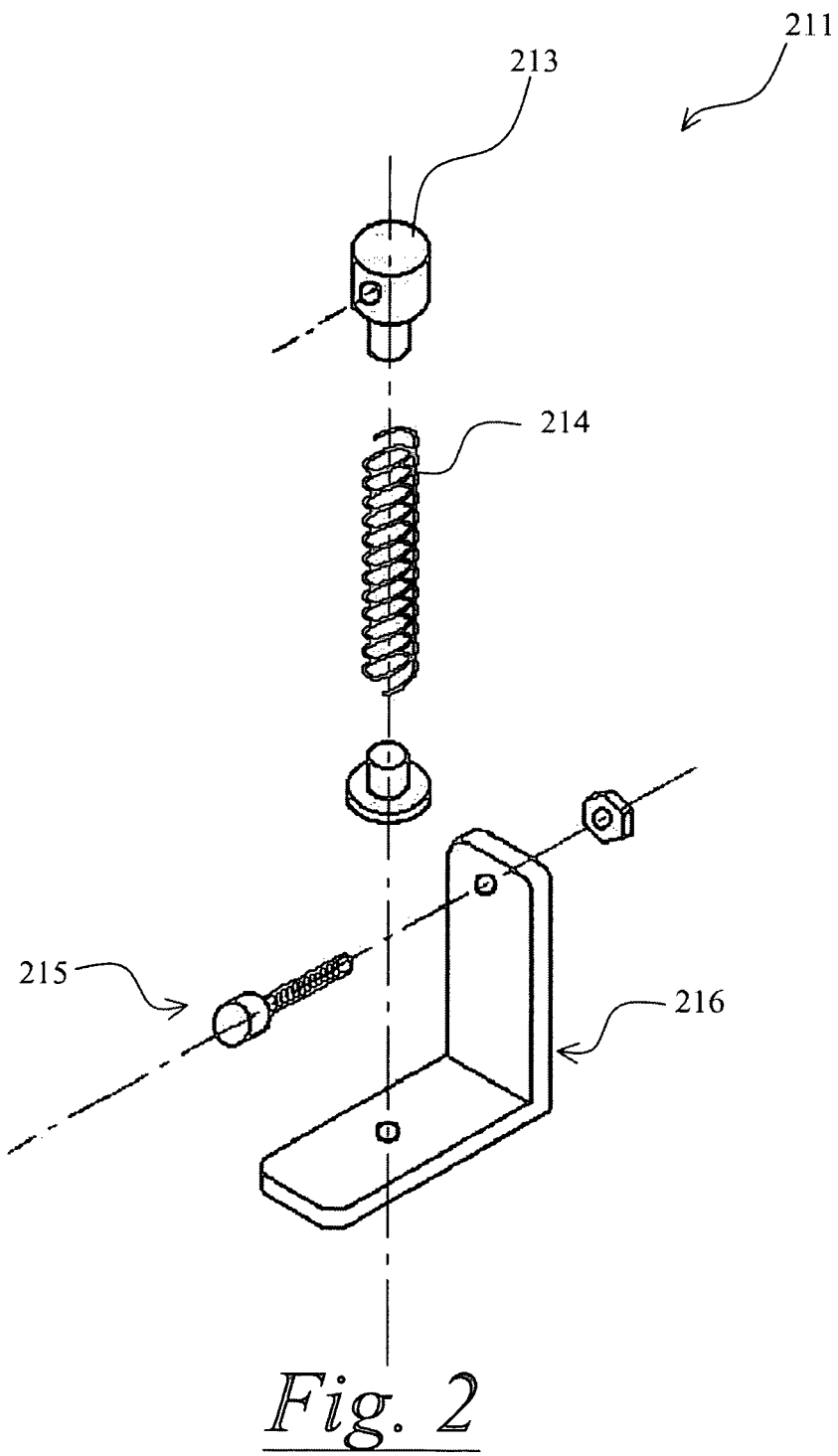
FIG. 2 shows an exploded view of an actuator for use in the present invention.

FIG. 2 shows in more detail an exploded view of the structure of the exemplary inertia actuator 210.

Figure 3:
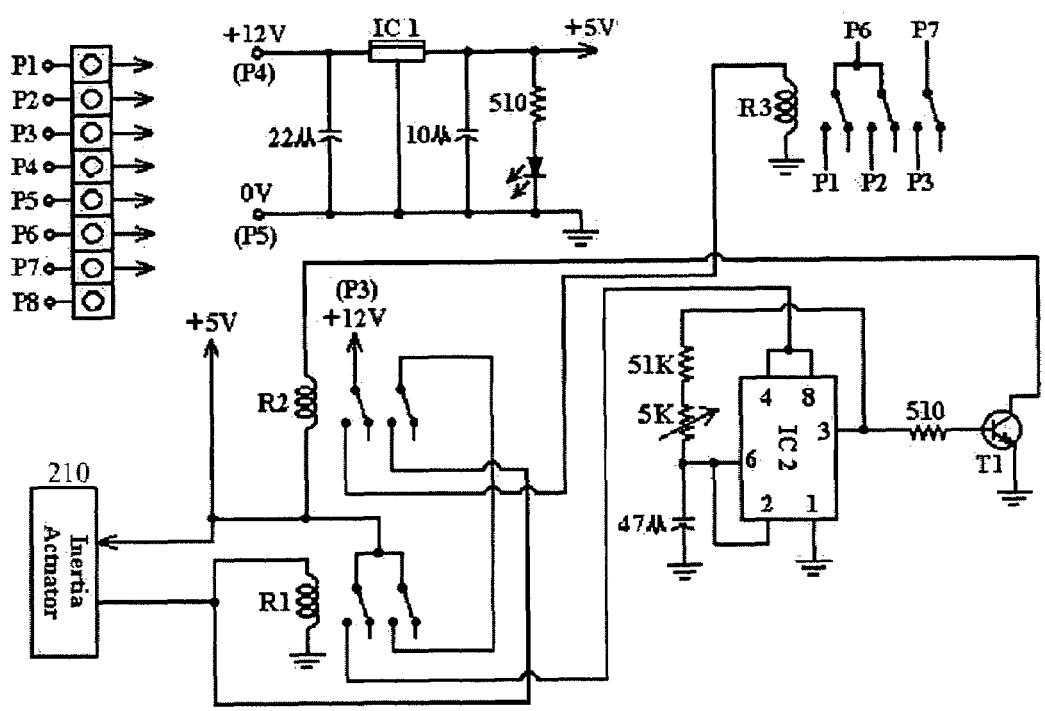
FIG. 3 is a schematic circuit diagram showing a circuitry of a preferred embodiment of the present invention.

FIG. 3 shows the circuitry of an example controller circuitry suitable for use in the present preferred embodiment. The controller includes ports P1-P7 for making interfacing connection with, among others, the power supply of the vehicle and the visual indicating means, which can be the conventional flashing lamps used both as indicating lamps and hazard warning lamps. Of course, additional or specific hazard indicators visible from behind the vehicle can be included. Connection details of the ports P1-P7 are set out in the table below. P8 is not shown in the circuitry as it is reserved for manual control by conventional manual actuation through an actuation button, for example, on the dashboard of a vehicle.

| | |
|---|---|
| P1 | right indicator lamp connection of the vehicle |
| P2 | left indicator lamp connection of the vehicle |
| P3 | 12 DV battery power supply (always on) of the vehicle |
| P4 | 12 DV input (while start switch on) of the vehicle |
| P5 | 0 V (ground) of the vehicle |
| P6 | flasher output connection of the vehicle |
| P7 | flasher input connection of the vehicle |
| P8 | emergency button lamp of the vehicle (not connected) |

The controller includes a power supply unit which converts the power supply of the vehicle, usually, 12V DC, into a regulated 5V DC supply by way of a voltage regulator IC, for example, a 7805. The regulated 5V supply is used for operation of the inertia actuator and the timer IC, for example, a NE555, to generate the intermittent flashing signals. The flashing intervals are usually defined by specifications of car manufacturers or motoring authorities of a country or a territory.

Turning now to the operation of this controller, when the inertia actuator is moved into the "make" condition, current will flow from the 5V regulator voltage source into the inertia actuator. This current will energize the relay R1 and activate the timer system which consist of the timer IC (IC2). The timer IC (IC2) in turn energizers the relay R2. The energizing of the relay R2 in turn energizers relay R3 as well as keeping the relay R1 in the "ON" condition. As a result, the relay R1 will remain in the energized state, even though the inertia actuator may have returned to the "break" condition.

As the relay R3 is coupled to both the left and right indicator lamps of the vehicle, its energizing will cause the left and right indicators, which together constitute the hazard warning or the emergency lamps of the present embodiment, to flash for a predetermined period of time for, say, example, five seconds. The duration of the hazard warning lamps operating time can be adjusted by a variable resistor connected to the timer IC without loss of triviality. When the predetermined flashing period has expired, the timer IC will send a low signal to disable the relay R2. When the relay R2 is disabled, the relays R1 and R3 are disabled as well, thereby releasing the hazard warning means (or the left-and-hand indicating lamps) and return the lamps to their non-activated states to await for the next operation.

It will be noted from the circuitry that the relay R3 is coupled to ports P1 and P2 so that the left-and-right indicator lamps can be simultaneously operated by energizing the relay R3. Of course, when used as a turn indicator, either P1 or P2 will be turned on at any one time. In the present preferred embodiment, the inertia actuator is adapted so that the contact heads will come into physical contact, thereby making electrical contacts, when the deceleration reaches 2 g, corresponding to a deceleration of 19.6 m/s$^2$. Of course, the actuation threshold deceleration can be set at any reasonable values without loss of generality.

Figure 4:
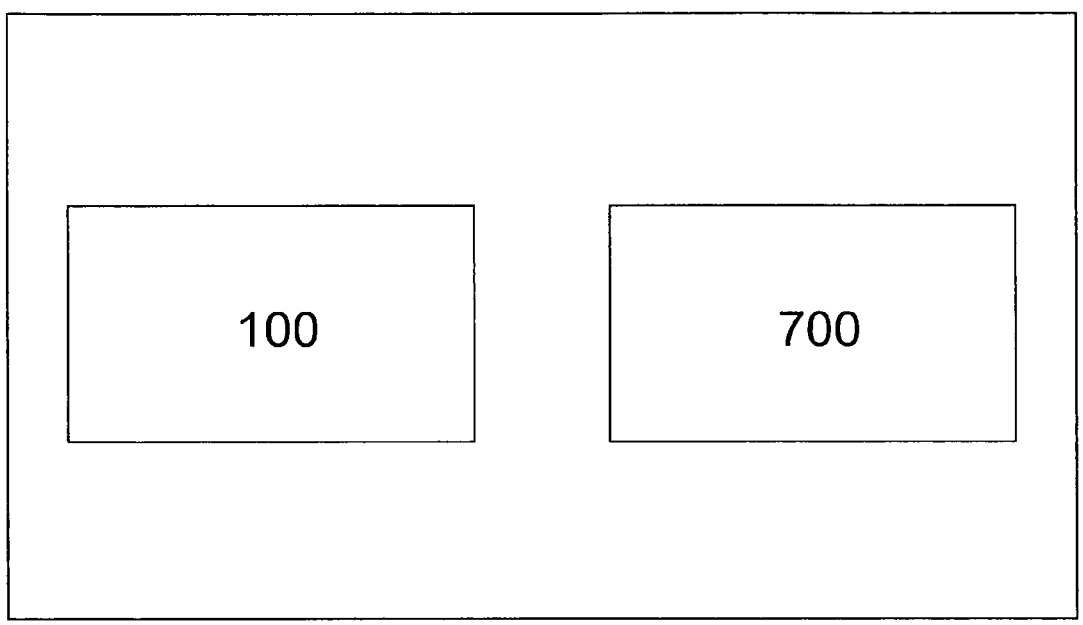
FIG. 4 is a schematic block diagram depicting an embodiment of the present invention including a vehicle in combination with an indicator and a hazard warning means.

Referring to FIG. 4, embodiments of the presently disclosed device may comprise a vehicle 600 including a combined indicator 700 and the hazard warning means 100.

While the present invention has been explained by reference to the preferred embodiments described above, it will be appreciated that the embodiments are only provided and illustrated as examples to assist understanding of the present invention and are not meant to restrict or limit the scope of this invention. In particular, the scope and ambit of this invention are to be determined from the general principles taught in this specification with reference to and as inferred or exemplified by the embodiments described above. More particularly, variations or modifications which are obvious or trivial to persons skilled in the art, as well as improvements made on the basis of the present invention, would of course within the scope and boundary of the present invention.

More specifically, while the present invention has been explained with reference to a hazard warning means for use in combination with existing turn indicating lamps, it will be appreciated that the hazard warning means can be installed and operated independent of the flashing indicator lamps so that a visible hazard warning signals can be generated independent of the turn indicators as soon as the deceleration conditions satisfy the prescribed threshold.

Furthermore, while the hazard warning means described above has been described with reference to conventional flashing indicator lamps disposed on the outside of vehicles, it will be appreciated that additional or alternative visual indicating means such as additional or alternative flashing lamps can be disposed on the periphery of vehicles for operating with the present hazard warning means to enhance safety.

Furthermore, while the present invention has been explained by reference to vehicles, it should be appreciated that the invention can apply, whether with or without modifications, to non-road going vehicles such as trains or ships without loss of generality.

We claim:

1. A hazard warning means for a vehicle, including:
   deceleration triggered actuation means for triggering actuation upon deceleration,
   controlling means for controlling visual indicators, and
   visual indicators,
   wherein said deceleration triggered actuation means includes means for detection of a deceleration of a prescribed threshold and means for generating an actuation signal upon detection of said deceleration, said controlling means includes means for causing said visual indicating means to generate visible signals representing hazard conditions for a predetermined time, and wherein said threshold of said deceleration relates to a response time that adjacent users will require to take responsive action when the deceleration exceeds said prescribed threshold.

2. A combination comprising a vehicle and the hazard warning means of claim 1.

3. A hazard warning means according to claim 1, wherein said hazard warning means is automatically activated upon braking of a vehicle over a predetermined braking threshold.

4. A hazard warning means according to claim 1, wherein said hazard warning means is automatically activated upon detection of deceleration exceeding a predetermined rate.

5. A hazard warning means according to claim 1 and further including visible display means, hazard condition detection means and control means, said control means being adapted to cause operation of said visible display means to operate in a hazard warning state upon detection of braking exceeding a predetermined rate by said hazard condition detection means.

6. A combination comprising a vehicle and the hazard warning means of claim 3.

7. Control means for vehicle indicating and hazard warning including:
   driving means for driving visible signal display means,
   signalling means for sending signals corresponding to at least first and second alternative operating states of a vehicle to said driving means,
   detection means for detecting a deceleration triggered actuation signal corresponding to the activation of said first operating state,
   decision means for outputting signals to be generated by said signalling means indicating said first operating state upon detection of said deceleration triggered actuation signal and regardless of whether said visible signal display means is operating in said second operating state.

8. A combined indicator and hazard warning means for a vehicle including visible display means, hazard condition detection means and control means, said control means causing said visible display to operate in at least two alternative operating states, wherein, in the first operating state, said visible display means operates as a vehicle indicator and, in the second operating state, said visible display means operates as a hazard warning means for warning other road users, and wherein said hazard condition detection means generates an actuation signal upon detection of deceleration beyond a prescribed rate, and said control means causes said visible display means to display hazard warning upon receipt of said actuation signal.

9. A combined indicator and hazard warning means for a vehicle according to claim 8, wherein said hazard condition detection means includes an inertia actuator.

10. A combined indicator and hazard warning means for a vehicle according to claim 9, wherein said inertia actuator includes an actuating lever with a free end and a fixed end, said free end includes a conductive contact for making electrical contact with a contact detector, and said free end is resiliently movable with respect to said fixed end.

11. A combined indicator and hazard warning means for a vehicle according to claim 9, wherein said visible display means includes at least a pair of light-emitting devices which blink alternatively when operating as an indicator, and both said light-emitting devices are turned on intermittently at predetermined intervals when operating as hazard warning means, and wherein operating as hazard warning means takes precedent over operating as an indicator.

12. A combined indicator and hazard warning means for a vehicle according to claim 11, wherein said light-emitting devices include at least one of LEDs and lamps.

13. A combined indicator and hazard warning means for a vehicle according to claim 9, wherein said first operating state is user actuatable and said second operating state is both user and automatically actuatable.

14. A combination comprising a vehicle and the combined indicator and hazard warning means of claim 10.

15. A combined indicator and hazard warning means for a vehicle according to claim 10, wherein the output of said contact detector is connected to said control means.

16. A combined indicator and hazard warning means for a vehicle according to claim 15, wherein said inertia actuator includes a mechanical inertia actuator which is activated when the deceleration exceeds 2 g, wherein "g" is the force of gravity.

17. A combination comprising a vehicle and the combined indicator and hazard warning means of claim 16.

18. A combination comprising a vehicle and the combined indicator and hazard warning means of claim 8.

* * * * *